United States Patent
Patterson et al.

(10) Patent No.: US 7,221,621 B2
(45) Date of Patent: May 22, 2007

(54) SYSTEM AND METHOD FOR IDENTIFICATION AND QUANTIFICATION OF SONAR TARGETS IN A LIQUID MEDIUM

(75) Inventors: Mark Robert Patterson, Gloucester Point, VA (US); Daniel Foster Doolittle, Miami, FL (US); Roger Leslie Mann, Dutton, VA (US); Zia-ur Rahman, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 226 days.

(21) Appl. No.: 11/099,689

(22) Filed: Apr. 6, 2005

(65) Prior Publication Data
US 2005/0270905 A1    Dec. 8, 2005

Related U.S. Application Data

(60) Provisional application No. 60/559,894, filed on Apr. 6, 2004.

(51) Int. Cl.
*G01S 15/88* (2006.01)
(52) U.S. Cl. .................. 367/88; 367/11; 382/103
(58) Field of Classification Search .................. 367/87, 367/88, 11; 382/103
See application file for complete search history.

(56) References Cited

U.S. PATENT DOCUMENTS

| | | | | |
|---|---|---|---|---|
| 5,155,706 A | * | 10/1992 | Haley et al. ................. 367/88 |
| 5,214,744 A | * | 5/1993 | Schweizer et al. ......... 382/103 |
| 5,321,667 A | * | 6/1994 | Audi et al. .................. 367/88 |
| 5,612,928 A | * | 3/1997 | Haley et al. ................. 367/11 |
| 5,995,882 A | | 11/1999 | Patterson et al. |

OTHER PUBLICATIONS

Abrams, William R., "A Practical High Tech Advance in Side Scan Sonar Target Positioning and Analysis", Seaquest Associates, IEEE 1988.*

* cited by examiner

*Primary Examiner*—Ian J. Lobo
(74) *Attorney, Agent, or Firm*—Foley & Lardner LLP

(57) ABSTRACT

A system and method for identifying and quantifying targets within a liquid medium. A raw sidescan sonar image is collected. A region of interest is separated from the image. An image transformation is performed using an extraction algorithm. Salient image characteristics are calculated. Spurious pixels are removed from the image to obtain an extracted region of interest. Particle analysis is performed on the extracted region of interest to generate a feature vector which is presented to a neural network for classification.

20 Claims, 13 Drawing Sheets

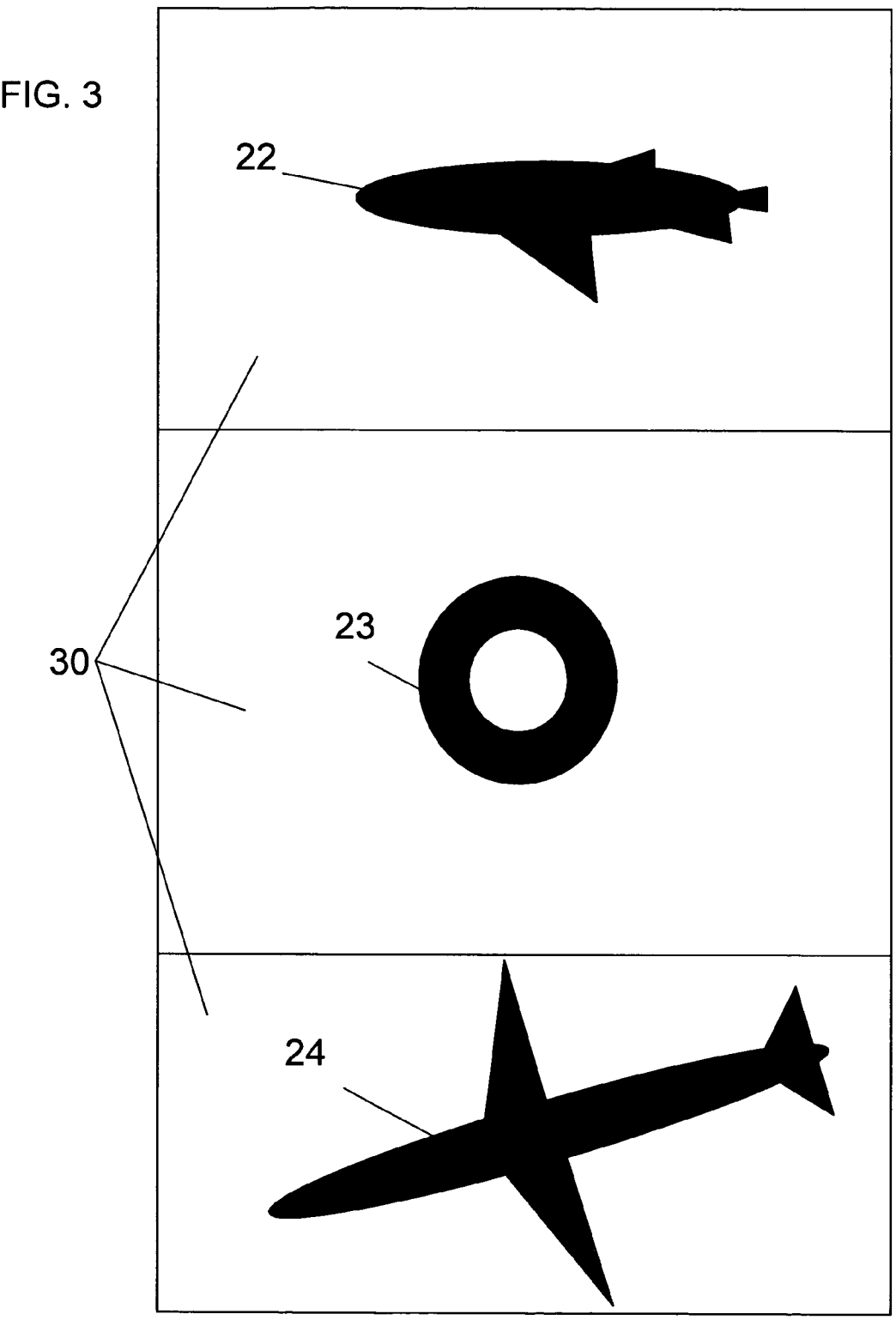

SYSTEM AND METHOD FOR IDENTIFICATION AND QUANTIFICATION OF SONAR TARGETS IN A LIQUID MEDIUM

CROSS-REFERENCE TO RELATED PATENT APPLICATIONS

This application claims priority under 35 U.S.C. 119(e) to U.S. Provisional Application 60/559,894, filed Apr. 6, 2004, which is incorporated herein by reference in its entirety.

STATEMENT REGARDING FEDERALLY SPONSORED RESEARCH OR DEVELOPMENT

This invention was made with government support under Grant No. NA96RG0025 awarded by the National Oceanic and Atmospheric Administration (NOAA). The government has certain rights in the invention.

FIELD OF THE INVENTION

The present invention relates generally to a system and method for identification of targets in a liquid medium. In particular, the method employs sidescan sonar imaging technology.

BACKGROUND OF THE INVENTION

Sidescan sonar is an acoustic imaging technology that uses high frequency (100 kHz to 2.4 MHz and higher) sound waves to "illuminate" the sea floor and produce realistic pictures of what lies at the sediment-water interface, and in the water column. As sound waves propagate away from the sidescan transducers, objects in the path of the beam reflect some of the acoustic energy back to the transducer, and these signals are then amplified, processed, and passed on to a video display, printer or computer vision/processing algorithms.

The earliest imaging sonar research is credited to British and German researchers beginning in the 1920's and 1930's, but suffered from the limitations of analog technology, namely attenuation of the sonar signal as it traveled further along copper wires, and deficiencies with the primitive signal display and recording equipment available at the time. Today, advances in digital signal processing and increased computational power have largely overcome these problems. Modern high frequency systems can reliably image objects that are smaller than 1 $cm^3$ and digital software can "stitch" together sonar records to make high-resolution, geo-referenced mosaics of the seafloor.

Side scan sonar proved its capabilities during the 1960's and 1970's as an indispensable tool to locate wreck, mines, lost nuclear weapons, and downed submarines and aircraft. The petroleum industry pioneered the commercial use of sidescan sonar for pipeline routing and inspection in the 1970's and 1980's as offshore drilling became popular. As the 1990's progressed, sidescan sonars became available in higher and higher frequencies that allowed significant advances in imaging resolution. With increased resolving power, common to modern systems, sidescan sonar has been used to map and classify marine fisheries habitats, detect and enumerate salmon during their upstream migrations, investigate trawl damage to marine habitat, and map relic oyster reefs in turbid, low visibility environments.

In view of the following an improved method and system is needed for identifying sonar targets within a liquid medium.

SUMMARY OF THE INVENTION

A computer implemented method for identifying and quantifying sonar targets within a liquid medium consisting of collecting a raw sidescan sonar image, separating a region of interest related to the sonar targets from the image, performing an image transformation on the image using an extraction algorithm, performing particle analysis on the extracted region of interest to generate a feature vector related to sonar targets and presenting the generated feature vector to a neural network to classify the image with respect to the sonar targets of interest.

A system for identifying and quantifying sonar targets of interest within a liquid medium including an autonomous underwater vehicle, a transducer mounted on the autonomous underwater vehicle to generate a sidescan sonar image, and a processor, for collecting the sidescan sonar image, housed inside the autonomous water vehicle. The processor is configured to separate a region of interest related to the sonar targets from the image, perform an image transformation on the image using an extraction algorithm, perform particle analysis on the extracted region of interest to generate a feature vector related to sonar targets and present the feature vector related to the sonar targets to a neural network to classify the image with respect to the sonar targets of interest.

A computer readable medium having program code recorded thereon, that when executed on a processor, identifies and quantifies a sonar target of interest in a liquid medium. The program code includes code for receiving a sidescan sonar image from a sonar region being monitored, code for separating a region of interest related to the sonar targets from the image, code for performing an image transformation on the image using an extraction algorithm, code for performing particle analysis on the extracted region of interest to generate a feature vector and code for present a feature vector related to the sonar targets to a neural network to classify the image with respect to the sonar targets of interest.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 3 is a block diagram that is representative of side scan sonar images that may be amplified, processed and later passed on to either a display or printer.

DETAILED DESCRIPTION

Figure 1:
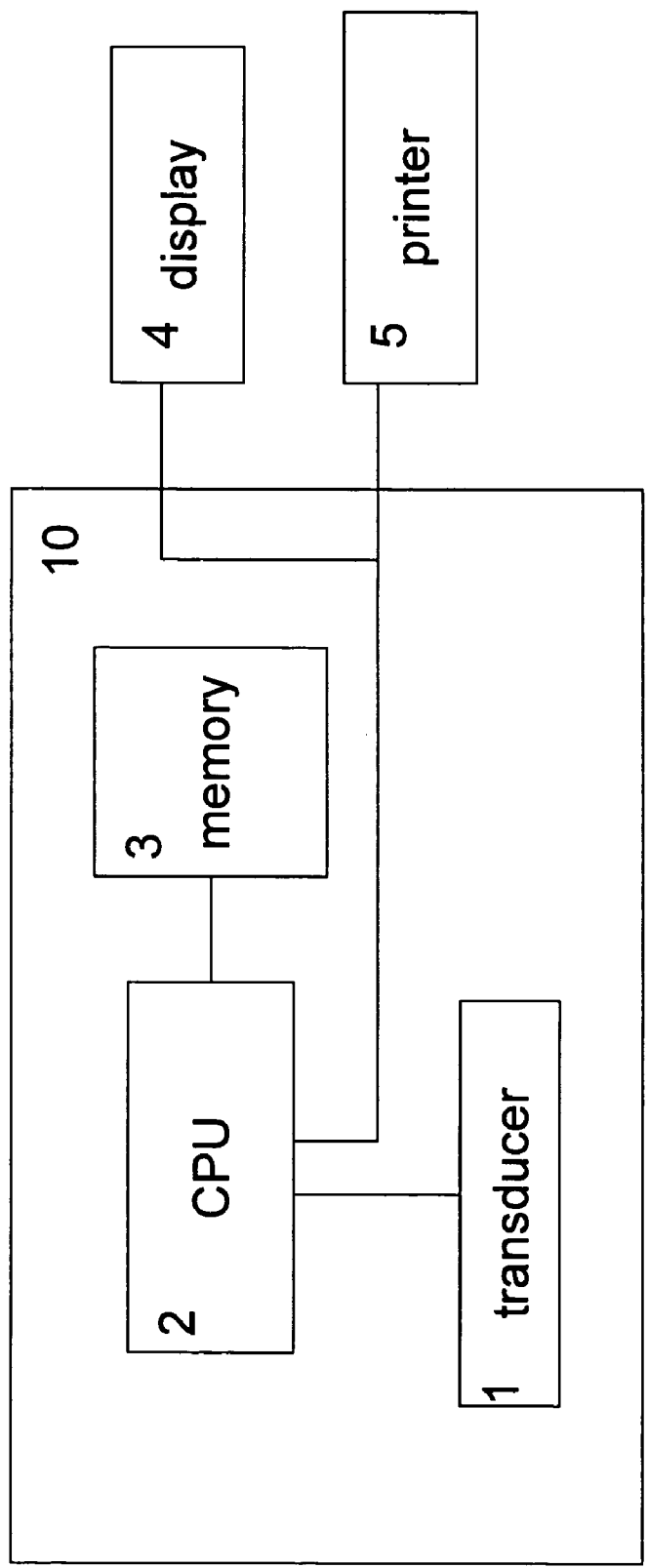
FIG. 1 is a block diagram of a system for identifying and quantifying sonar targets according to one embodiment of the invention.

Embodiments of the present invention will be described below with reference to the accompanying drawings. It should be understood that the following description is intended to describe exemplary embodiments of the invention, and not to limit the invention.

The application of new sonar, image processing, and computer technologies that allow stock assessment teams and working fishermen to accurately and reliably discriminate between fish species would be a major step towards solving the problems of unwanted and wasteful fisheries bycatch. Additionally, such technologies would give a more detailed insight into the composition and size of fish stocks and would likely result in the reduction of the biases and imprecision that are inherent in trawl surveys, and the resulting stock assessments. Moreover, a method for classifying objects in a liquid medium could be used by numerous law enforcement, security and military agencies to secure ports, rivers and larger bodies of water from previously unknown or hard to detect underwater threats.

The method of the present invention, in certain embodiments, is directed toward a way of identifying and quantifying targets within a liquid medium. The liquid medium may be of any type of liquid known to those of ordinary skill in the art. For example, the liquid could be a mixture of liquids such as oil and water or a neat liquid such as purified water. In addition, the liquid may contain particulate matter such as salts, e.g., seawater. The liquid could also be a mixture of salt and fresh water such as that found in an estuary.

Autonomous Underwater Vehicles (AUVs), or free-swimming robots, are currently being developed worldwide at government, academic and private research laboratories, with dozens of AUVs already in operation. Currently, AUVs are essential tools for seabed surveys, oceanographic data collection, offshore oil and gas operations, and military operations. Data collected from AUVs represent the significant cost savings in terms of reduced personnel hours, 24-hour sampling capabilities, and reduced surface ship support. Ship-based surveys for offshore pelagic or demersal fisheries resources can cost anywhere from $10,000 per day for surveys in northwest Atlantic ocean waters up to $38,000 per day for Antarctic fisheries research, excluding salaries of onboard personnel. Combining AUV technology with high resolution sidescan sonar should provide a useful tool for stock assessment and related fisheries questions, including the delineation of essential fish habitat, especially in areas that are hard to sample, e.g. reef environments or shallow waters. An implementation of AUV technology is described in U.S. Pat. No. 5,995,882, herein incorporated by reference in its entirety.

Given that individual fish and fish shoals can be discerned from modern sidescan imagery, significant progress can be made using sidescan sonar coupled with novel image processing and classification algorithms to automatically classify and enumerate individual fish, with the goal of augmenting traditional stock assessment. Such methods could be applied to detecting, classifying and specifically identifying man-made and naturally occurring objects in a liquid medium.

As proposed in certain embodiments of the present invention, one such processing algorithm or technique is a neural network. A neural network is an information processing construct that loosely emulates the way the brain processes and classifies information. A neural network is composed of a large number of highly interconnected processing elements (neurons). A neural network is configured for a specific task. Collectively, each neuron is configured to solve a common problem. A key feature of neural networks is that they can learn how to recognize patterns, classify information and predict future events based on known existing data. One advantage of neural networks is that they can be used to extract patterns that are too complex for conventional computer processing or even humans to discern.

A block diagram of a system for identifying and quantifying targets in a liquid medium 10 is shown in FIG. 1. A transducer 1 for transmitting and receiving a sonar signal is operatively connected to a processor 2. The processor 2, preferably a digital signal processor, is configured to execute steps for identifying sonar targets in a liquid medium as will be discussed below. A memory 3 is operatively connected to the processor 2. The system may also include but does not require a display 4 or printer 5 operatively connected to the processor.

Figure 2:
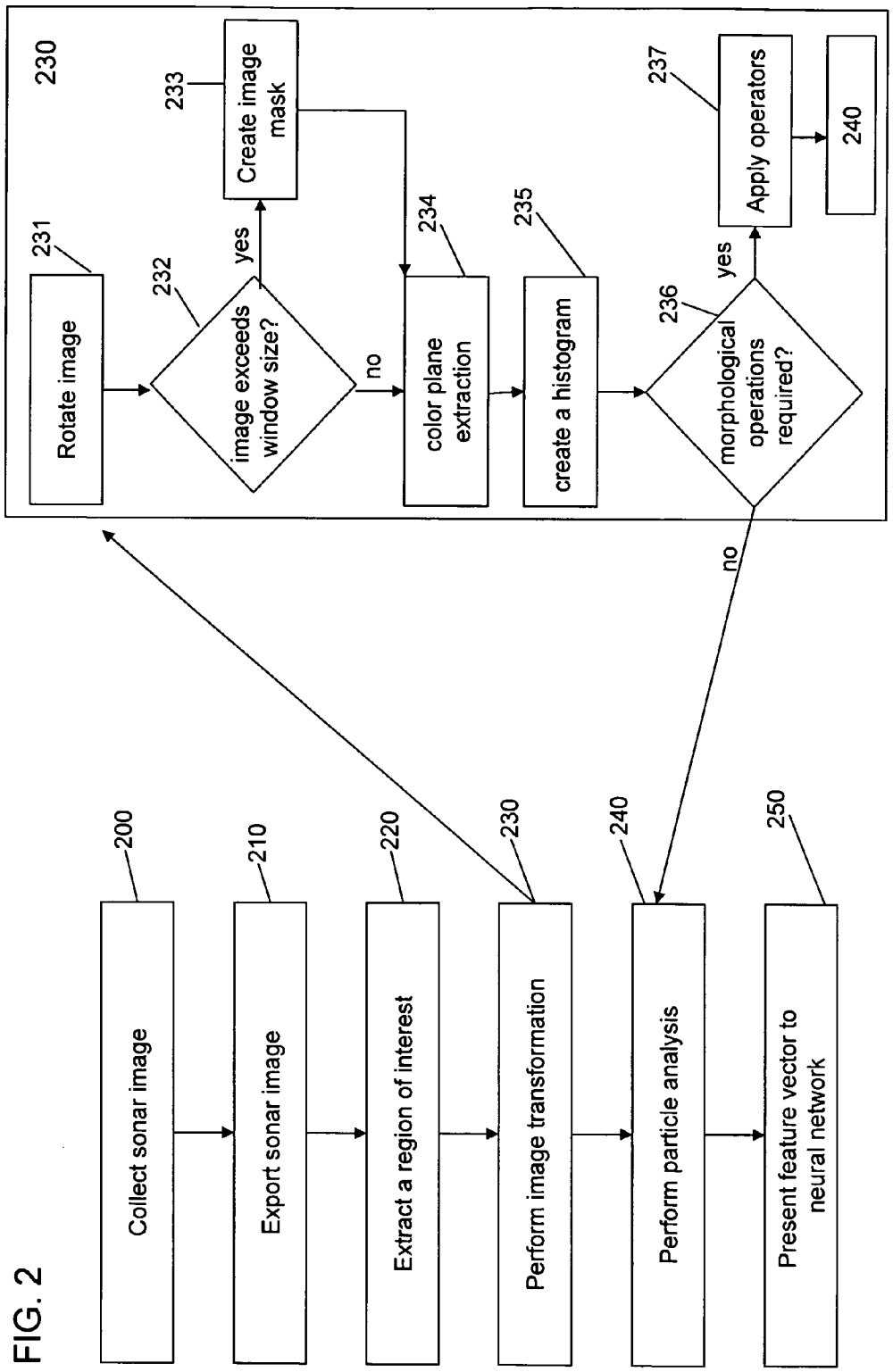
FIG. 2 is a flow diagram of a method for identifying a target in a liquid medium according to one embodiment of the invention.

As seen in FIG. 2, in practicing a method in certain embodiments of the present invention, one collects a raw sidescan sonar image (Step 200). Sidescan sonar is an acoustic imaging technology that uses high frequency, preferably ranging from about 100 kHz to 2.4 MHz, sound waves to "illuminate" the sea floor and produce realistic pictures of what objects are on the bottom and within a water column. At high frequencies there is enough information in sidescan sonar images to train and use a neural network for classification and identification purposes as will be discussed below. As sound waves propagate away from the sidescan transducers 1, objects in the path of the beam reflect some of the acoustic energy back into the sonar instrument, and these signals are then amplified, processed and passed on to either a display 4 or printer 5 or transmitted for further processing.

FIG. 3 is a block diagram representative of examples of captured sidescan sonar images As depicted in FIG. 3 sidescan sonar can capture images such as a shark 22, a tire 23 or a downed aircraft 24 within a liquid medium 30. It should be recognized that FIG. 3 is exemplary only. One skilled in the art would recognize that various other objects could be discerned in a sidescan sonar image from a liquid medium.

Figure 4A:
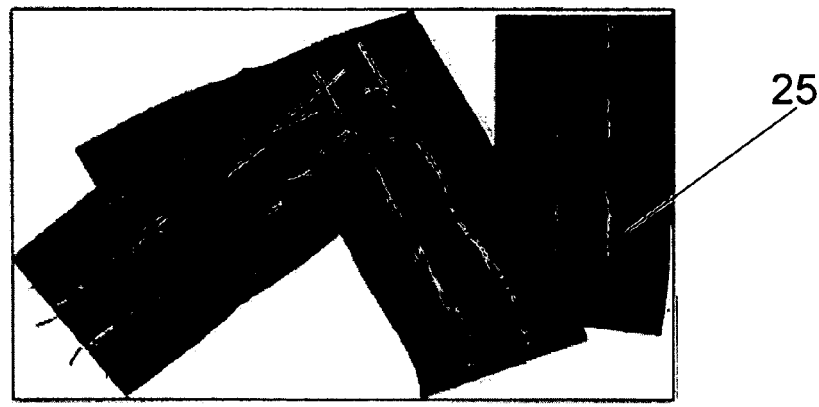
FIGS. 4A–C are block diagrams that are representative of a high-resolution, geo-referenced, digital side scan sonar mosaic of the seafloor.
Figure 4B:
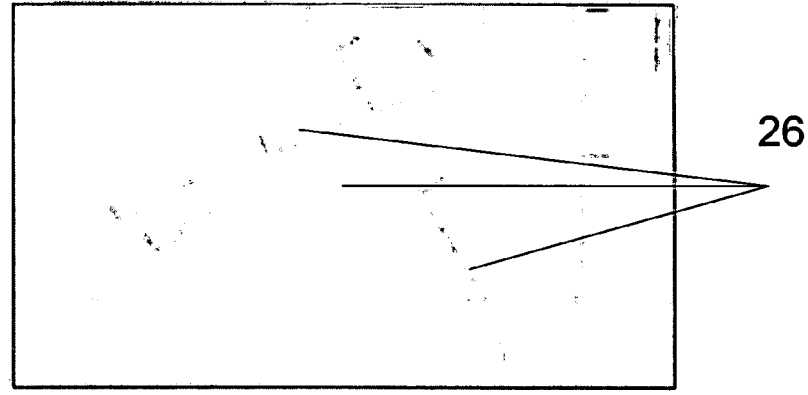
Figure 4C:
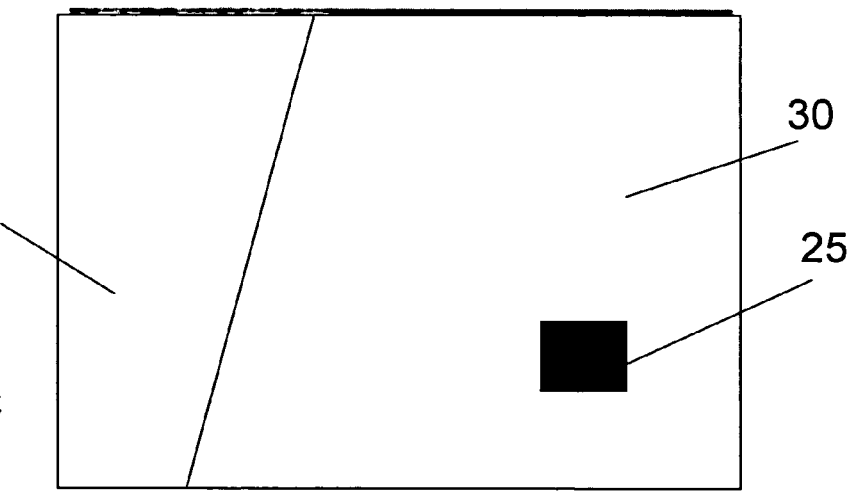

Modern high frequency systems can capture reliable image objects that are smaller than 1 $cm^3$ and digital software run on a processor 2 can "stitch" together sonar records to make high-resolution, geo-referenced, digital mosaics of the seafloor or matter in a water column. FIG. 4A is a diagram that depicts a high-resolution, geo-referenced, digital side scan sonar mosaic of the seafloor 25. FIG. 4B depicts navigation lines used to map each image of the sea floor 25 to a position. Finally FIG. 4C is representative of an aerial view depicting the location of the sea floor 25 in a liquid medium 30 relative to a shore line 40.

Raw sidescan images are exported (step 210) as image files. For example, the raw sidescan images may be exported as Tagged Image File Format (TIFF) files using software. For example, Seascan PC, commercially available from Marine Sonic Technology Limited, may be used to export the raw sidescan images. Generally, the image files are 1024 lines by 500 pixels wide, and have a time-stamp marking each ping return line (corresponding to a horizontal row of pixels) which is also saved by using a customized TIFF field. Of course, these dimensions are exemplary only and one skilled in the art would recognize other variations and alternatives all of which are considered part of the present invention.

Next, a region of interest is extracted from the raw sidescan image (step 220). Regions of interest are those regions of the image containing a target, for example, fish, mines, swimmers or other objects of interest. These targets are extracted from regions containing the seafloor, sea clutter, first bottom return, air-water interface, etc. An image processing and extraction algorithm is used to extract the region of interest. For example, LabVIEW 6.1 with IMAQ Vision 6.0 (commercially available from National Instruments) may be used to develop extraction algorithms that separate regions of interest.

Next, an image transformation is performed using the image processing and extraction algorithm described above (Step 230). As seen in FIG. 2, image transformation includes several steps including but not limited to rotation 231, image masking 233, color plane extraction 234, histogram creation 235, and basic and advanced morphological operations 237. Each image may be first rotated from dimensions of 1024 by 500 pixels to 500 by 1024 pixels to return the image to the dimensions under which it was originally collected (step 231). This step may be required to maintain the proper aspect ratio of each sonar target. However, it should be noted that this step is not essential.

Next, if the image containing the ROI exceeds a window size, an image mask is created around the ROI thus isolating it from the background (step 232–233). For example, if the image containing the ROI exceeded a window size of 220 pixels by 220 pixels then an image mask would be created (step 233).

The pixel intensity histogram is then computed (step 234), as well as length, width, area, and mean pixel intensity values. A threshold operator is applied, followed by a dilation and (or) an erosion operation, in order to remove any spurious pixels from the frame before particle analysis operators are invoked (step 235). Different speckle/noise reduction techniques such as adaptive median filtering can also be employed as is known to those skilled in the art of image processing.

Next, it is determined whether the image requires further morphological operators to be applied (step 236). For example, this is warranted when some artifact of the original sonar image, such as the air-water interface, is corrupting the bounding box surrounding the ROI. When this occurs, a morphological operator that removes pixels touching the borders of the bounding box is applied (step 237).

Particle analysis is then performed on the extracted ROIs to obtain a feature vector (step 240). Exemplary metrics (i.e., vector components) derived by this procedure are listed in Table 1 below. All data is collected with the same range settings. Affine transformations are performed on metrics when appropriate to provide dimensional similarity in the resulting data sets, and to ensure that all images used for training and classification by the neural network show all objects at the same size.

TABLE 1

| Vector component | Description |
| --- | --- |
| Pixels | Number of pixels contained within the ROI |
| Length | Number of pixels in longest segment of the ROI |
| Width | Number of pixels in widest segment of the ROI |
| Aspect ratio | Length measurement divided by width measurement |
| Area | Surface area of the ROI |
| Variance pixel | Standard deviation of pixel values within the ROI |
| Mean pixel | Mean intensity of pixels within the ROI |
| Intensity ratio | Standard deviation divided by mean intensity of pixels within the ROI |
| Image area | Surface area of bounding rectangle surrounding the ROI |
| Center mass x | X-coordinate of center of mass of the ROI |
| Center mass y | Y-coordinate of center of mass of the ROI |
| Left column x | Left x-coordinate of the bounding rectangle |
| Top row y | Top y-coordinate of the bounding rectangle |
| Right column x | Right x-coordinate of the bounding rectangle |
| Bottom row y | Bottom y-coordinate of the bounding rectangle |
| Box width | Width of the bounding rectangle in pixels |
| Box height | Height of the bounding rectangle in pixels |
| Longest segment length | Length of the longest horizontal line segment |
| Longest segment left column (x) | Leftmost x-coordinate on the longest horizontal line segment |
| Longest segment top row (y) | Top y-coordinate on the longest horizontal line segment |
| Perimeter | Length of the outer contour of the ROI |
| Sum x | Sum of the x-axis for each pixel of the ROI |
| Sum y | Sum of the y-axis for each pixel of the ROI |
| Sum xx | Sum of the x-axis squared for each pixel of the ROI |
| Sum yy | Sum of the y-axis squared for each pixel of the ROI |
| Sum xy | Sum of the x-axis and y-axis for each pixel of the ROI |
| Corrected projection X | Sum of the vertical segments in a ROI |
| Corrected projection Y | Sum of the horizontal segments in a ROI |
| Moment of inertia Ixx | Inertia matrix coefficient in xx |
| Moment of inertia Iyy | Inertia matrix coefficient in yy |
| Moment of inertia Ixy | Inertia matrix coefficient in xy |
| Mean chord X | Mean length of horizontal segments |
| Mean chord Y | Mean length of vertical segments |
| Max intercept | Length of the longest segment in the convex hull of the ROI |
| Mean intercept perpendicular | Length of the chords in an object perpendicular to its max intercept |
| Target orientation | Direction of the major axis of the ROI |
| Equivalent ellipse minor axis | Total length of the ellipse axis having the same area as the ROI and a major axis equal to half the max intercept |
| Ellipse major axis | Total length of the major axis having the same area and perimeter as the ROI in pixels |
| Ellipse minor axis | Total length of the minor axis having the same area and perimeter as the ROI in pixels |
| Ratio of equivalent ellipse axis | Ratio of the length of the major axis to the minor axis |
| Rectangle big side | Length of the larger side of a rectangle that has the same area and the same perimeter as the ROI in pixels |
| Rectangle small side | Length of the smaller side of a rectangle that has the same area and the same perimeter as the ROI in pixels |
| Ratio of equivalent rectangle sides | Ratio of rectangle longest side to rectangle shortest side |
| Elongation factor | Ratio of the longest segment within the ROI to the mean length of the perpendicular segments |

TABLE 1-continued

| Vector component | Description |
|---|---|
| Compactness factor | Ratio of ROI area to the area of the smallest rectangle containing the ROI |
| Heywood circularity factor | Ratio of the ROI perimeter to the perimeter of the circle within the same area (a circle has a Heywood circularity factor of 1). |
| Type factor | Complex factor that relates the ROI surface area to the ROI moment of inertia |
| Hydraulic radius | Ratio of the ROI's area to its perimeter |
| Waddel disk diameter | Diameter of the disk that has the same area as the ROI in pixels |
| Diagonal | Diagonal of an equivalent rectangle (with area equal to the ROI) in pixels |

Next, the feature vector related to the sonar targets, as developed by the particle analysis step, is presented to a neural network to classify the image with respect to the sonar targets of interest (step 250).

Artificial Neural Networks (ANNs) are computational models that are inspired by advances in neuroscience and neurobiology. Essentially, as would be recognized by one skilled in the art, a neural network is composed of many simple processors, called units or nodes, organized into layers that may possess discrete amounts of local memory. Each of these layers and individual units are connected to each other and carry various sorts of numerical data. Each unit processes and passes on, or halts, the data that it receives from other units or layers. From a biological model, each node or unit is similar to a neuron and the connections between units are similar to synapses. It is important to note that artificial neural networks take their design from biological models, but do not attempt to replicate real neural connections.

Figure 7:
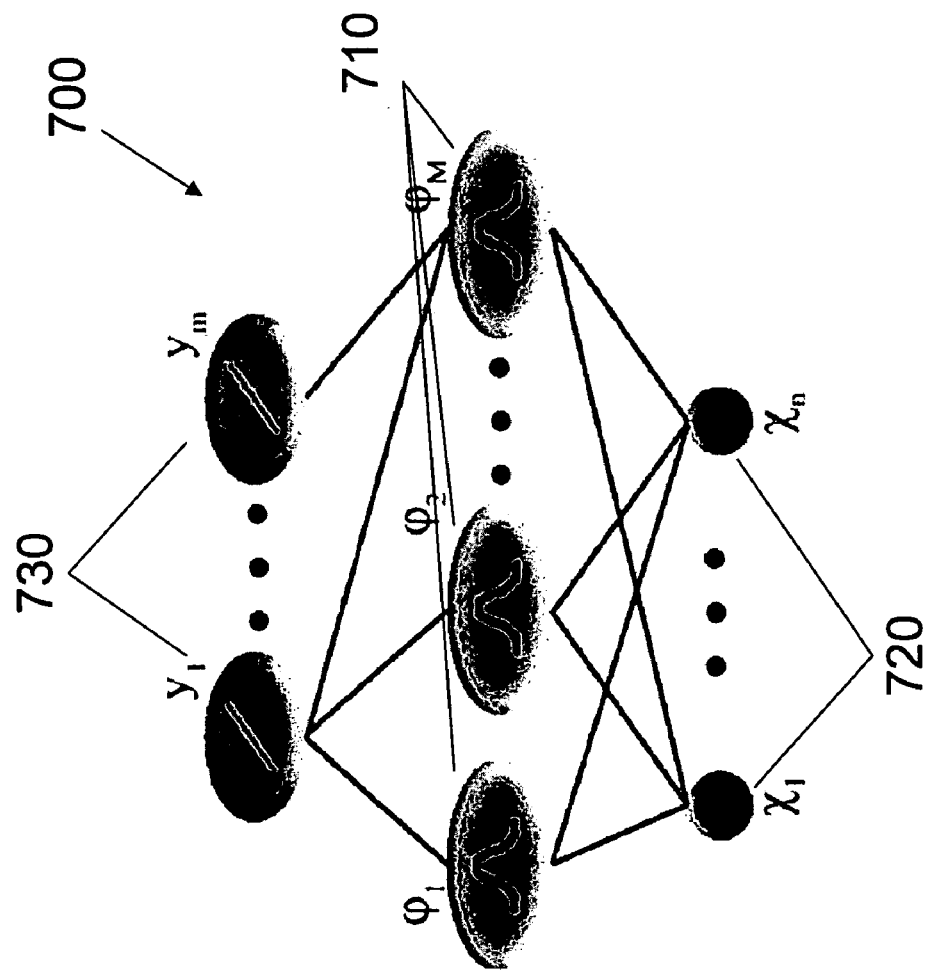
FIG. 7 shows a model of a RBF network according to one embodiment of the present invention.

In certain embodiments of the present invention, Radial Basis Function (RBF) artificial neural networks are the most robust candidate for classification of sidescan sonar imagery. RBF networks offer the advantages of high levels of noise immunity and great ability in solving complex, nonlinear problems in the fields of speech and pattern recognition, robotics, real time signal analysis, and other areas dominated by non-linear processes. An RBF network has locally tuned overlapping receptive fields that are well suited for classification problems. In the recent past, multilayer perceptron (MLP) ANN models were considered to be superior to classification problems. However, in the classification tasks for identifying targets of interest in a liquid medium, as discussed herein, RBF networks have several advantages over MLP designs including faster convergence, smaller extrapolation errors, less sensitivity to how training data is presented, and a greater reliability against noisy data. FIG. 7 shows a model of a RBF network 700 and a formal description as given by S.-T. Li & E. L. Leiss, Radial Basis Function Networks 1, 94–124 (Robert J. Howlett & Lakhmi C. Jain eds., Physica-Verlag 2001), herein incorporated by reference in its entirety, now follows.

RBFs are a class of feed-forward networks that possess a single hidden layer of neurons, or processing units 710. The transfer functions for the hidden units 710 are defined as radially symmetric basis functions ($\phi$) that are Gaussian, and are given by:

$$\varphi_i(x) = \exp\left\{-\frac{\|x - \mu_i\|^2}{2\sigma_i^2}\right\}$$

where $\mu_i$ is the center, or mean, of the i-th Gaussian and $\sigma_i^2$ is the variance. Given an $N_D$-observation data set $D=\{(x_i, y_i)|i=1, \ldots, N_D\}$, the RBF can be thought of as a function approximation that performs the following mapping:

$$\lambda: \Re^{N_I} \to \Re$$

such that $$y_i = \lambda(x_i) + \epsilon_i,\ i=1, \ldots, N_D,$$

where $\lambda$ is the regression function, the error term $\epsilon_i$ is a zero-mean random variable of perturbation, $N_I$ is the dimension of the input space, and $x_i$ and $y_i$, are the i-th components of the input 720 and output 730 vectors, respectively.

Each unit in the hidden layer 710 of the RBF forms a localized receptive field in the input space X 720 that has a centroid located at c, and whose width is determined by the variance $\sigma^2$ of the Gaussian equation. This allows a smooth interpolation over the total input space. Therefore, unit i gives a maximal response for input stimuli close to $c_i$. The hidden layer 710 then performs a nonlinear vector-valued mapping $\phi$ from the input space X 720 to an $N_H$-dimensional "hidden" space $\Phi$ $\{\phi(x_i)|i=1, \ldots, N_D\}$, $$\phi(x): \Re^{N_I} \to \Re^{N_H} \qquad (4)$$

where $\phi(x)=[\phi_1(x), \ldots, \phi_{N_H}(x)]^T$ is an $N_H$-dimensional vector.

Each nonlinear basis function $\phi(x)$ is then defined by some radial basis function $\phi$ $$\phi_i(x)=\phi(\|x-c_i\|),$$

where $\|.\|$ is the Euclidean norm on $\Re^{N_I}$.

Finally, the output layer 730 performs a linear combination of the nonlinear basis function $\phi_1$ to generate the function approximation by $\hat{\lambda}$:

$$\hat{\lambda}(x, D) = \sum_{i=1}^{N_H} w_i \phi_i(x).$$

Figure 8:
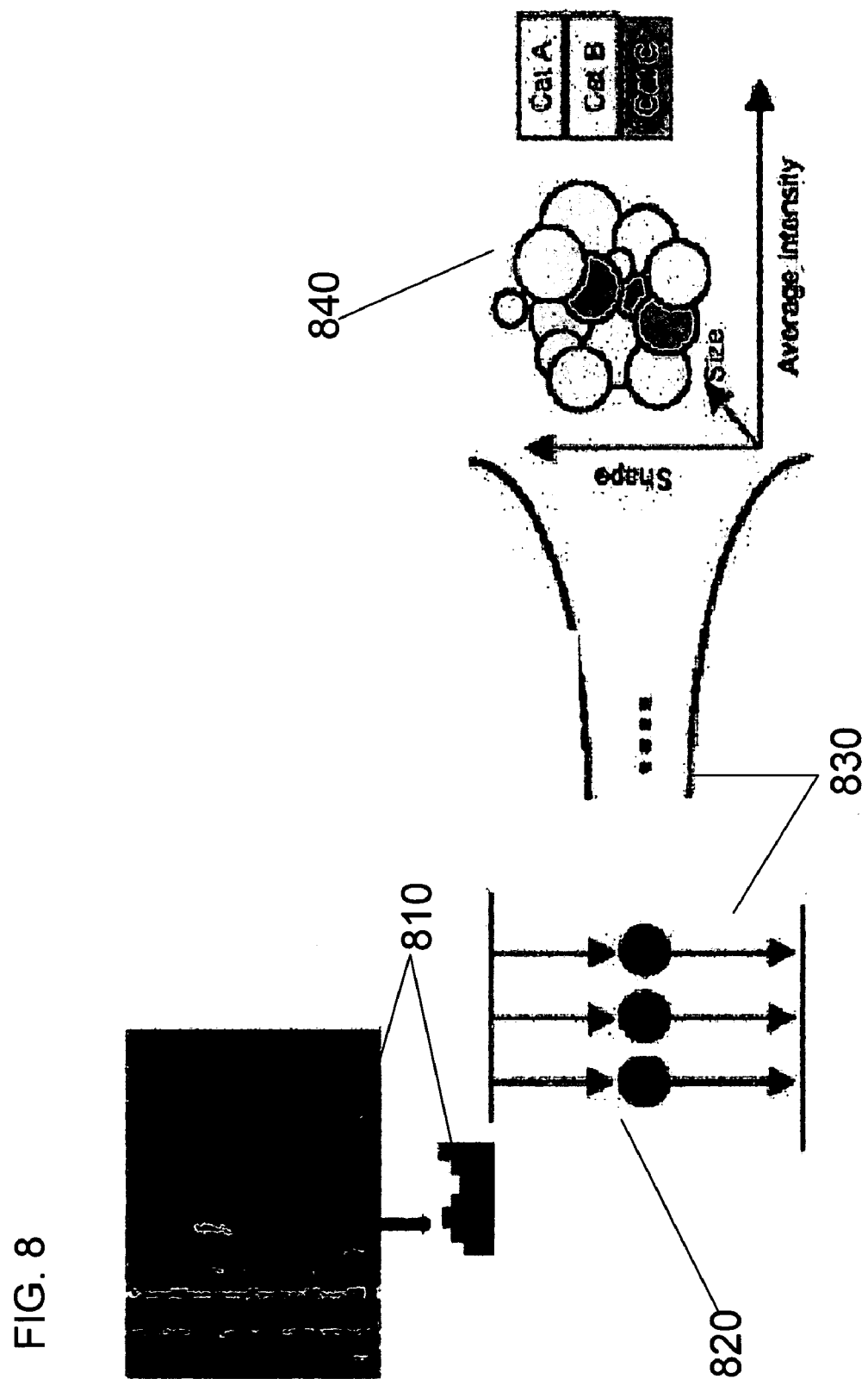
FIG. 8 depicts the overall procedure whereby the output layer makes linear combinations of the nonlinear basis function to generate the function approximation according to one embodiment of the invention.

The overall scheme of the procedure is shown in FIG. 8. Step 810 is a graphical representation of feature extraction on a sonar image. Step 820 illustrates that the feature vector is sent to all neurons in the RBF neural network 700 and categories are returned at once by all firing neurons (step 830). These categories are then mapped to a decision space (step 840).

Figure 9:
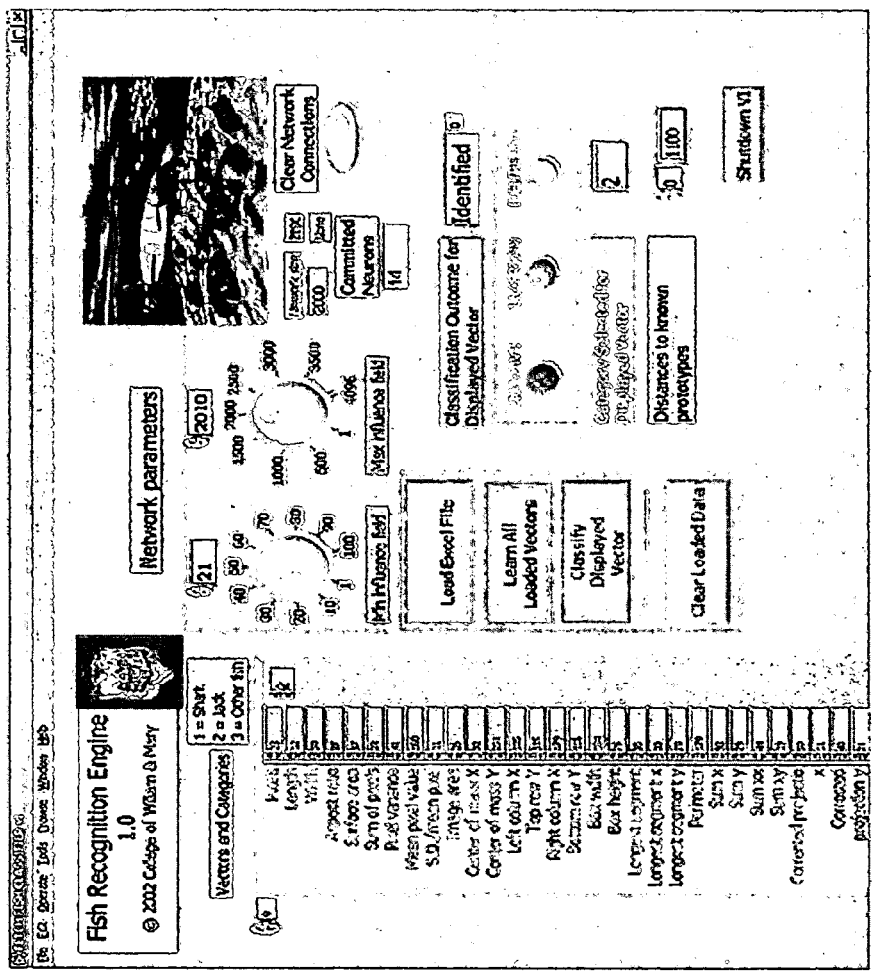
FIG. 9 shows an implementation of an RBF model using the LabVIEW-based software package ZDK according to one embodiment of the invention.

For example, an implementation of an RBF model in the LabVIEW-based software package ZDK may be used to map image vectors to three outputs: jack, shark, or neither jack nor shark (FIG. 9). The image vector data extracted by the LabVIEW IMAQ Vision algorithms are stored in a file such as an Excel spreadsheet and imported into the ZDK-based recognition engine. Image vector components are automatically scaled to 8-bit resolution, to comply with ZDK input requirements.

Influence fields are important features of the learning process of the ZDK RBF neural network 700 and are defined here in order to more clearly describe the subsequent learning and recognition tasks. The Active Influence Field (AIF) of a neuron describes the area around the stored prototype (or the variance around the Gaussian center in the RBF model described earlier). The AIF of a neuron is automatically adjusted as new vectors are introduced during network training. The Maximum Influence Field (MAF) defines the largest influence field value that can be assigned to one neuron, while the Minimum Influence Field (MIF) defines the smallest influence field value when a reduction in the AIF occurs during the learning of a new prototype. When a neuron's AIF is reduced and limited to this value, the neuron prototype lies very near the boundary of its category space and is likely to be overlapped by another space. When this happens, the neuron is considered to be "degenerated" and is flagged for removal from the network.

Figure 10:
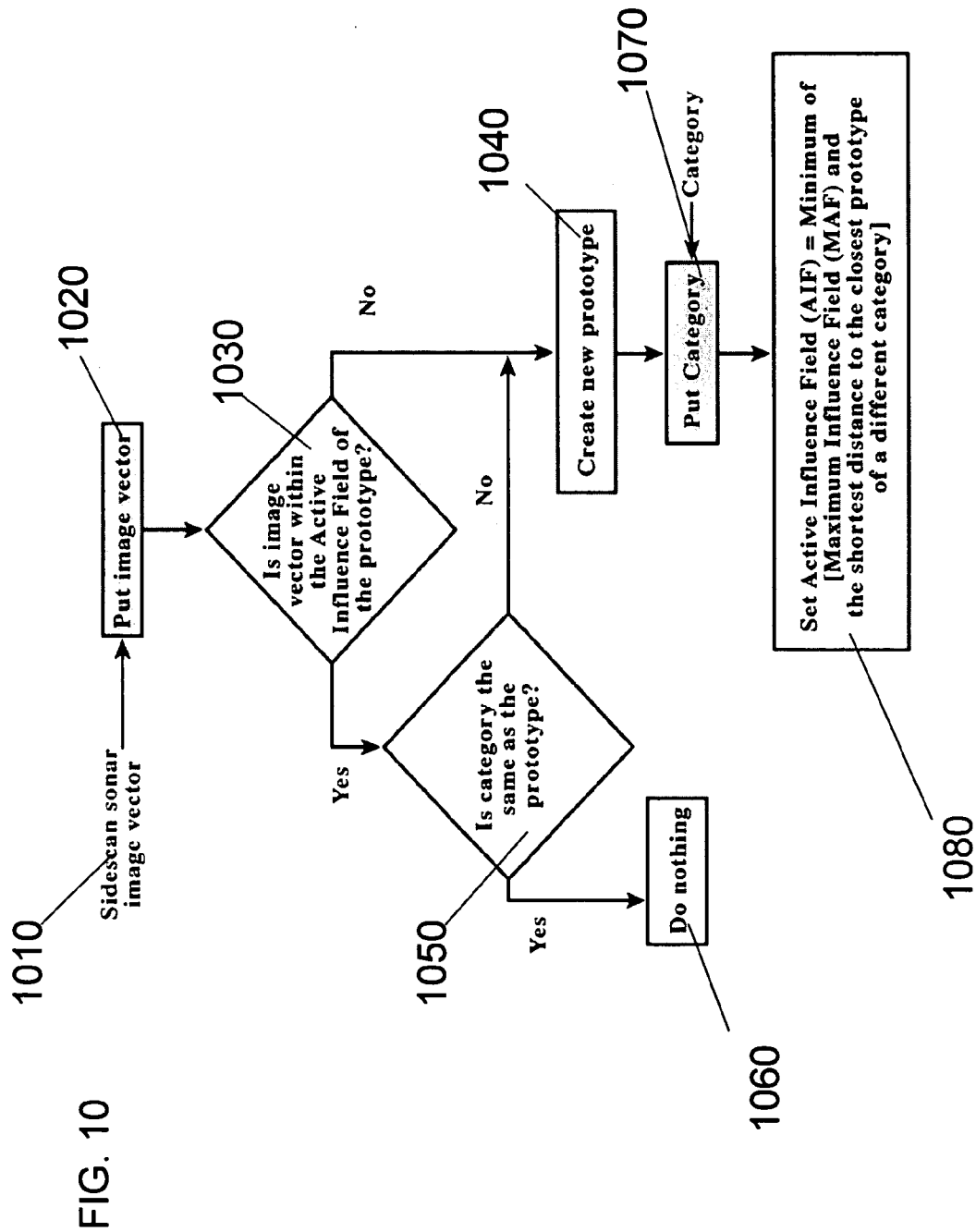
FIG. 10 shows a graphical illustration of the process of adjustment of input fields according to one embodiment of the invention.

As shown in FIG. 10, a learning process is required to train the neurons with prototype, or ground-truthed sidescan sonar images. The learning process may consist of the following steps:

Obtain a sidescan sonar image vector (step 1010) and present the image (or feature) vector to a neural network 700 (step 1020). If the presented vector is not within the influence field of any prototypes already stored in the network, then a new neuron is committed to that vector (steps 1030–1040). If the input vector falls within the influence field of an already learned vector, no change is made to the network connections or influence fields (steps 1030, 1050–1060). If the input vector falls within the wrong influence field, or is mismatched to its category, then one or more influence fields are readjusted (steps 1070–1080). Adjustment of the influence field occurs at the MAF or the MIF. If the MIF is adjusted to a minimum threshold level it is considered a "degraded" neuron and is subsequently flagged for removal.

Figure 11:
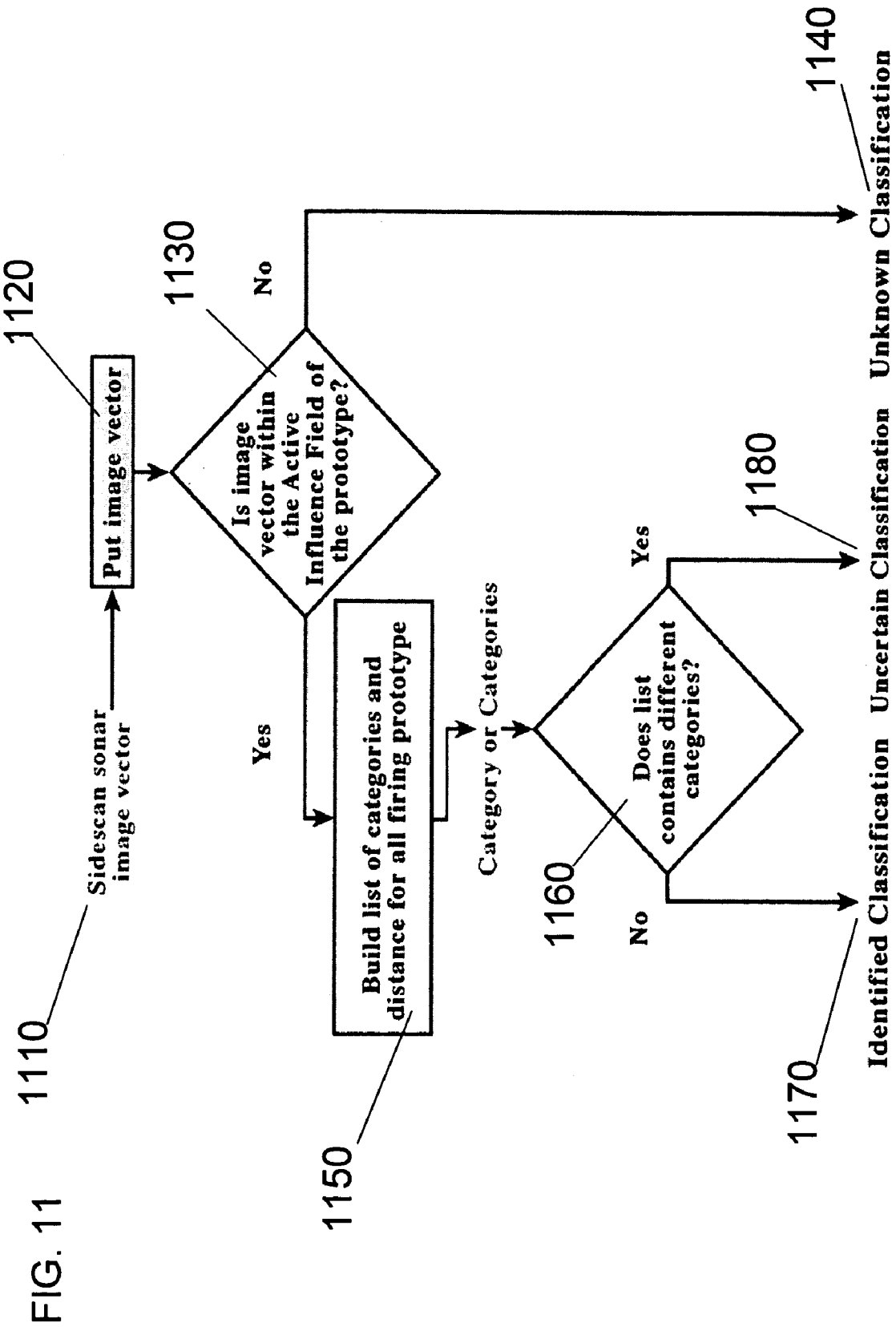
FIG. 11 depicts the classification process according to one embodiment of the invention.

As shown in FIG. 11, once the network 700 has been trained with prototypes or ground-truthed imagery, it is ready to perform recognition tasks on previously unseen data. First a sidescan sonar mage is obtained (step 1110) and presented as an image or feature vector (step 1120) to a neural network 700. Formally, classification consists of evaluating whether an N-dimensional input vector lies within the AIF of any prototype in the network (step 1130). If the vector is not within the AIF of any prototype in the network it is classified as not recognized (step 1140). If the vector is within an AIF, the input is recognized as belonging to that AIF's corresponding category (step 1150). If the vector lies within two or more prototypes' AIFs that are assigned to two different categories, then the input is coded as "recognized but not formally identified" (steps 1160–1180). Otherwise, the input is coded as "formally identified" (step 1170).

Figure 12:
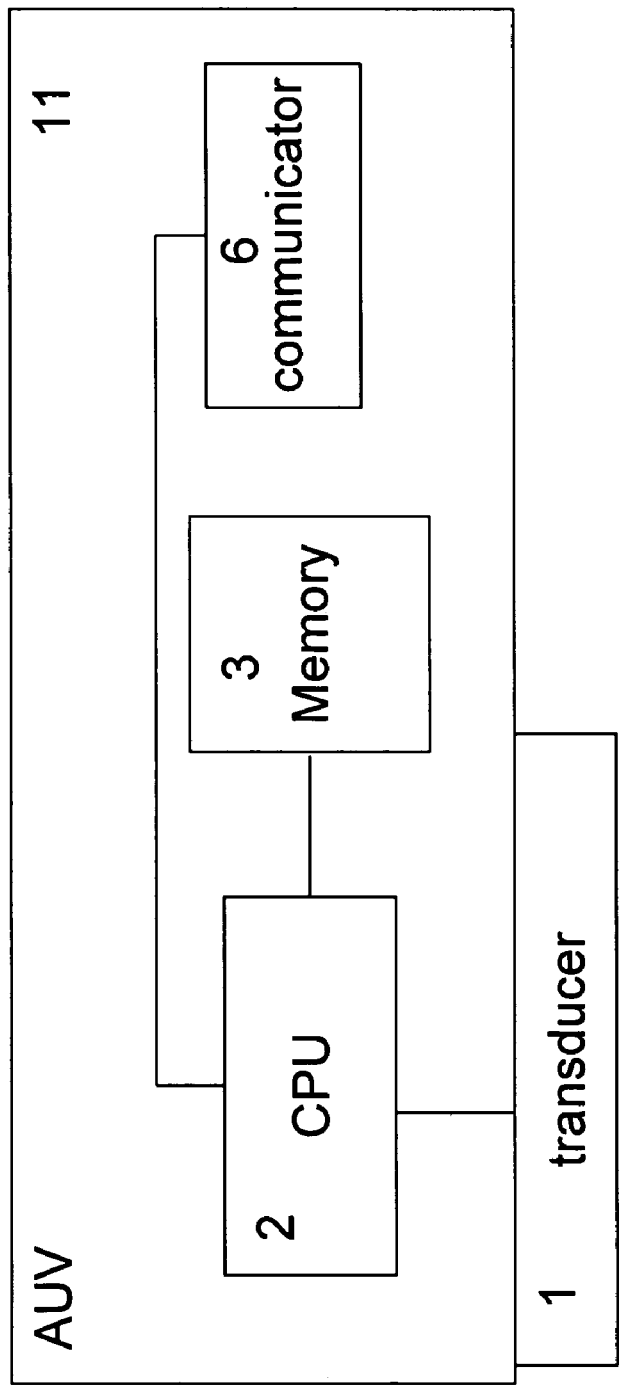
FIG. 12 is a block diagram of an AUV system for identifying sonar targets.

According to another embodiment of the invention, a system for identifying and quantifying targets in a liquid medium is shown in FIG. 12. An AUV 11 is configured to patrol a body of water or other desired liquid medium. A transducer 1 for transmitting and receiving a sonar signal is mounted to the AUV 11 and is operatively connected to a processor 2, preferably a digital signal processor, housed inside the AUV 11. The processor contains AUV 11 control software and 2 is configured to execute steps for identifying sonar targets in a liquid medium as discussed above. A memory 3 is operatively connected to the processor 2. The system also includes but does not require a communication unit or communicator 6 for reporting the positive identification of targets of interest. That is, the communication unit 6 of the AUV may be configured by the AUV 11 control software to automatically communicate to a central location that it has detected a target of interest.

Figure 5:
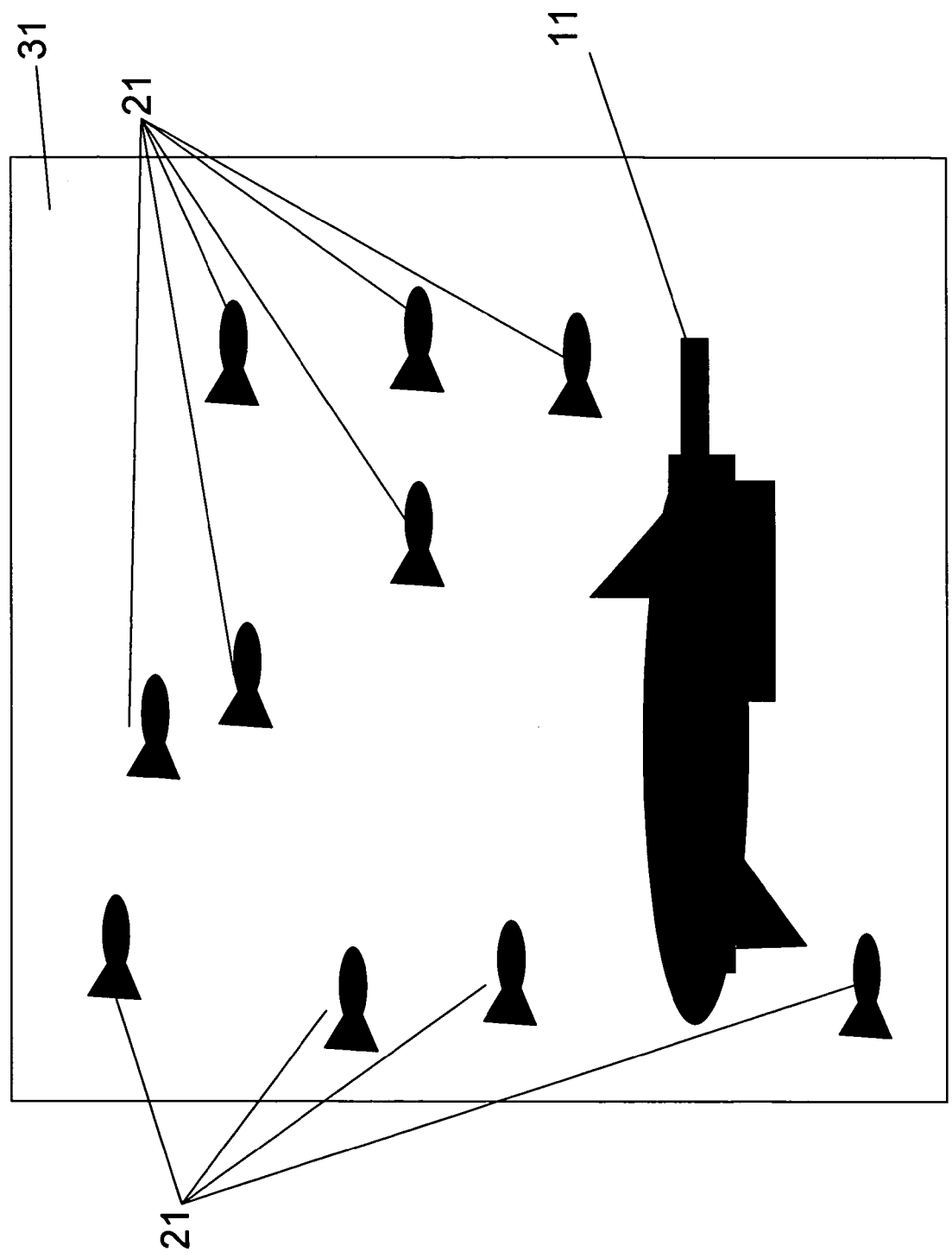
FIG. 5 is a block diagram representative of ground-truthed images of fishes from the Virginia Marine Science Museum.
Figure 6:
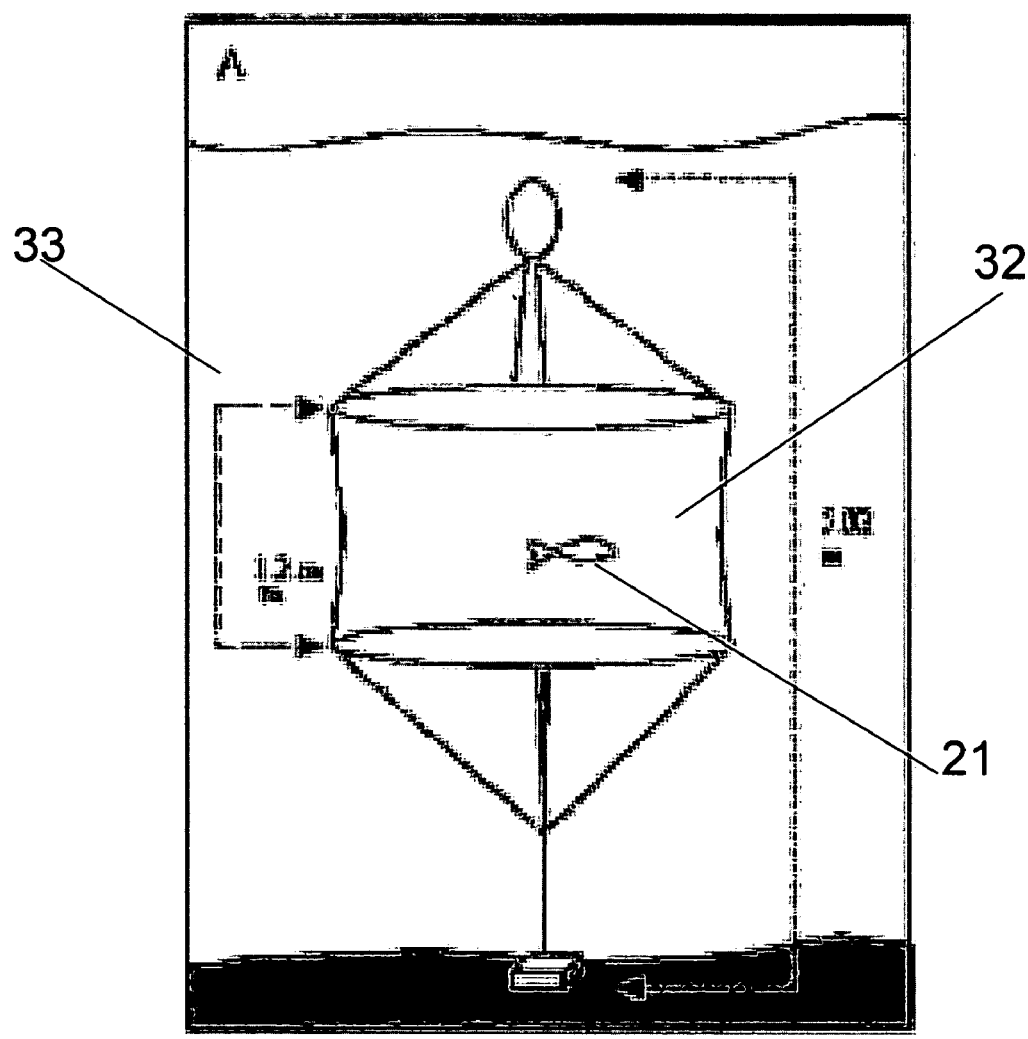
FIG. 6 is a block diagram representative of ground-truthed images of fishes from test pens in the York River, Va.

For example, FIGS. 5 and 6 are representative of a Fetch-class AUV 11 (manufactured by Sias Patterson, Inc) equipped with a 600 kHz sidescan sonar (Marine Sonics Technology, Ltd. ("MSTL")) used to acquire ground-truthed sonar images of fishes 21 from the Virginia Marine Science Museum aquarium 31 and from test pens 32 (see FIG. 6) placed in the York River 33, Va., a sub-estuary of the Chesapeake Bay. In the river, range settings of 5, 10, and 20 m, with a 5 m range delay were used, and in the aquarium, 5 or 10 m with no range delay were used. A range delay of 5 m combined with a 10 m range setting was used most frequently in the field, as it provided a good compromise between acoustic resolution and area surveyed. The focal point of the particular transducer geometry was approximately 10 m. Fixed gain settings were found to be ineffective for image collection in dynamic environments. MSTL Host-Remote commands are enabled onboard the AUV 11 to ensure automatic setting of the time varying gain (TVG) levels using a fuzzy-logic based algorithm.

The AUV 11 collected data on natural fish abundance and fish avoidance behavior on several occasions, surveying a shallow tidal creek (Sarah Creek, York River, Va. 37° 15.29' N. 76° 28.84' W. 1–4 m depth), and the lower York River itself (37° 14.20' N. 76° 28.00' W. 2–25 m depth). This latter survey occurred in conjunction with sampling by a Virginia Institute of Marine Science (VIMS) research vessel conducting a fisheries stock assessment trawl. Additional sonar images were acquired with a similar 600 kHz towfish and topside computer system deployed from a VIMS Garvey class, small vessel.

Images were also collected by the AUV 11 in a public aquarium. The AUV 11 was suspended by ropes 1.5 m above the floor of the tank. Time-stamped Hi-8 mm analog videos of fishes passing in the beam of the transducer were recorded. The pinging rate of the sonar was adjusted to be appropriate for the swimming speed of fishes transiting in a gyre around the periphery of the tank.

Table 2 shows the results of classifying 33 novel images (12 of sand tiger, 14 of crevalle jack, and 7 of fish that were not sharks or jacks, including barracuda, spadefish, tarpon, and cobia.

Table 2

Results of classification process reported as the percentage of images (n=33) correctly classified. The radial basis function network 700 classifies image vectors as "identified," "uncertain," or "unknown." Unknown classifications are an indication that more training vectors are needed or that the ANN'S perimeters require adjustment. An uncertain classification may still be correct but that particular vector is likely near the edge of the Active Influence Field of the ANN. Results are reported as a range of percentages for each network setting. The lower bound of the range reflects a conservative evaluation of that particular network, as we considered "uncertain" classification as incorrect, even though the network correctly, but uncertainly, identified that particular vector. Evaluation of each network was accomplished with a Leave One Out (LOO) method of training the network n–1 times and presenting the unknown vector to the classifier and recording the classification result.

| Results and settings | Network 1 | Network 2 | Network 3 |
|---|---|---|---|
| Percent success (training images) | 100 | 100 | 100 |
| MIF[a] Settings | 2 | 2 | 75 |
| MAF[b] Settings | 2123 | 4096 | 3072 |
| "Unknown" classifications | 4 | 0 | 1 |
| "Uncertain" classifications | 2 | 0 | 3 |
| Percent success (training images) | 78.8–84.8 | 90.1–97.0 | 84.8–87.9 |

[a] The Minimum Influence Field (MIF) is the lower limit of the neurons' influence field. The greater the MIF value the greater the possibility of overlapping categories. This increases the probability of "uncertain" classifications.
[b] The Maximum Influence Field (MAF) defines the variance around the center of the neuron. Tuning this value to the a smaller number is preferred as it will result in more "identified" responses.

The overall success of the classifier ranged from 90.1% to 97.0% with 1 image being incorrectly classified and 2 images classified correctly but with uncertainty. The success of the classifier on all training images was 100%. Following the teachings of Nelson and Illingworth (Nelson. M. M. & W. T. Illingworth. A practical guide to neural nets. Addison-Wesley Publishing Company 1991) the classifier described herein may be deemed properly trained because 100% classification accuracy was achieved on training images and an acceptably high (90.1 to 97.0%) accuracy level with novel images. The goal is to classify a putative target at some predetermined successful percentage rate, using the fewest number of classification metrics in the prototype (training) and test images. In other words, the image vector should contain enough information to successfully classify the target.

Surveys in the field revealed that the AUV 11 can easily count individual fish, even in schools, if the range setting is kept to 10 m or 5 m. When the AUV 11 passed through a school of fish, turning motions of the school away from the AUV 11 were minimal, even when the AUV 11 was within 2 m of the targets. Further, the AUV 11 imaged abundant putative fish targets in the water column in the York River when surveying over 2.5 nautical miles of this habitat in depth-following mode, swimming 3 m deep, while a simultaneous trawl by a 65' research vessel caught no fish.

The above description is only illustrative of certain embodiments that achieves the objects, features and advantages of the present invention, and it is not intended that the present invention be limited thereto.

Figure 13:
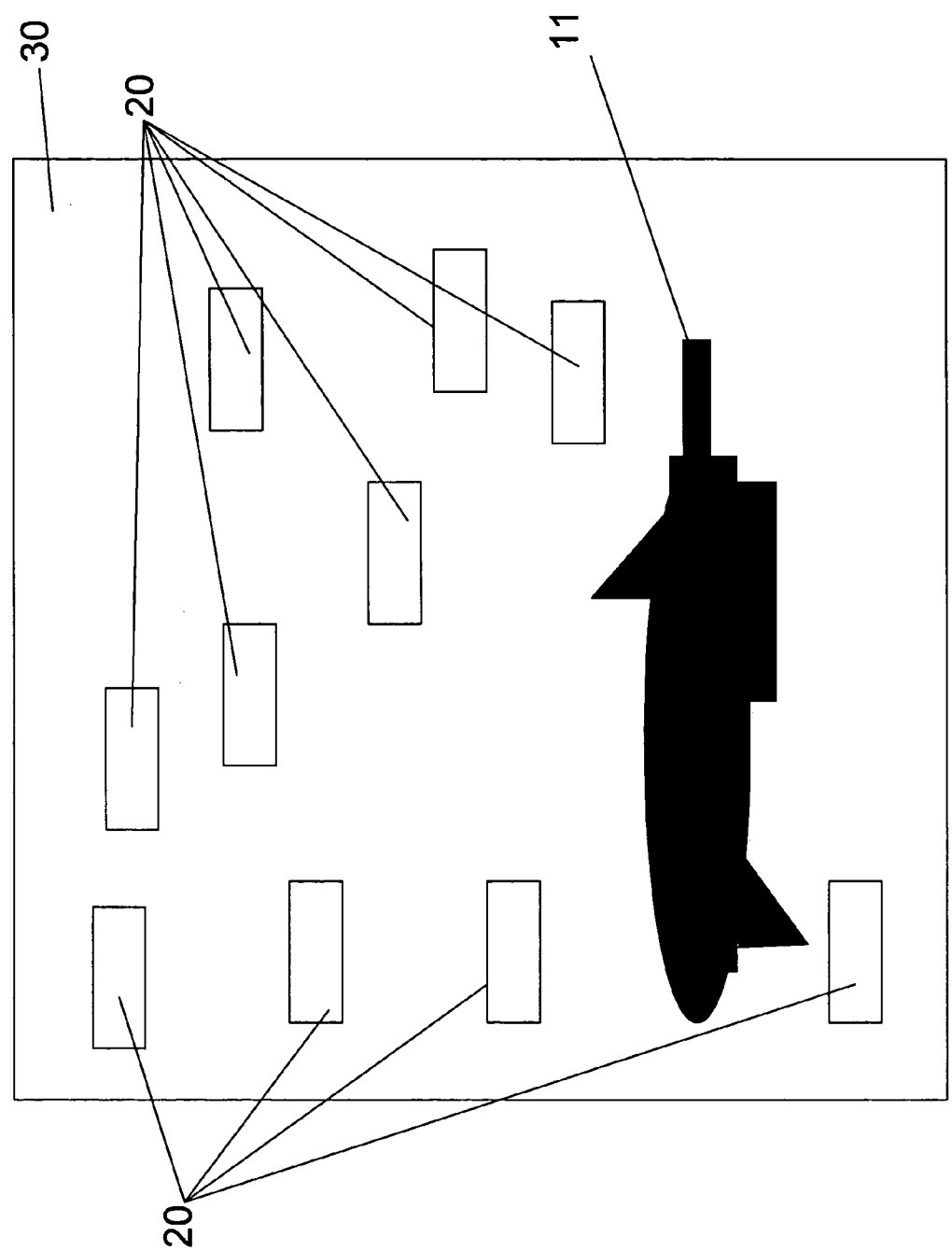
FIG. 13 is a diagram of an AUV system in a liquid medium.

Similarly, an AUV system as shown in FIGS. 12 and 13 may be used to identify other targets of interest 20 in liquid mediums 30 (e.g. oceans, lakes, rivers, ports, etc.). Targets of interest 20 might include but are not limited to swimmers, manned underwater vehicles, underwater mines, or other terrorism or security related objects, etc. AUV's 11 with image classification are particularly suited for target identification over conventional sidescan methods, such as a vessel using a towfish. For example, a vessel mounted with a towfish may capture skewed images due to rough waters. In addition, a towfish's depth of exploration is limited in comparison to a AUV 11. Further, an AUV 11 does not expose humans to what may be harsh or even dangerous underwater environments. In order to properly identify targets 20, the AUV system would include an AUV 11, a memory 3 and a processor 2 configured to carry out the image identification and classification steps described above. This has several advantages over prior known identification methods in that humans are not relied upon to classify each captured image. Instead, only those images that match images classified as targets of interest are reported for further human evaluation or for taking certain action. This significantly reduces the occurrence of false positives making the entire process more effective and cost efficient. Further, the system may include a communication unit 6 which allows a AUV 11 to communicate the identification of a target of interest or an unknown target to an identification center (not shown). The communication unit 6, for example, may be any known method of communication from an underwater vehicle such as a AUV 11. The identification center is configured to further investigate identified targets of interest or unknown targets.

Certain embodiments of the present invention offers several advantages over prior art systems. The processing algorithm introduced here includes a radial basis function (RBF) neural network classifier that can recognize individual targets of interest including fish, swimmers, unmanned vehicles, underwater mines, etc. The application introduces the successful integration of sidescan sonar into an autonomous underwater vehicle (AUV) 11 for imaging targets of interest 20 in various liquid mediums 30 including the wild, underwater pens, and public aquaria. Further the method introduces image extraction and classification algorithms capable of robustly distinguishing targets of interest, and identifying steps necessary for the automation and integration of the classifier algorithms into the AUV 11 control software for future adaptive sampling needs, i.e., re sampling or tracking targets of interest.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A computer implemented method for identifying and quantifying sonar targets within a liquid medium, the method comprising the steps of:
    collecting a raw sidescan sonar image;
    separating a region of interest related to the sonar targets from the image;
    performing an image transformation on the image using an extraction algorithm;
    performing particle analysis on the extracted region of interest to generate a feature vector related to sonar targets; and
    presenting the generated feature vector to a neural network to classify the image with respect to the sonar targets of interest.

2. A method according to claim 1, wherein the neural network is a radial basis function neural network.

3. A method according to claim 2, wherein the radial basis function neural network is trained with prototype sidescan sonar images by performing the steps of:
    obtaining a feature vector derived from the prototype image;

presenting the image vector to the radial basis function neural network;

if the presented feature vector is not within an influence field of any prototypes already stored in the network, committing a new neuron to the presented vector;

if the presented feature vector falls within an influence field of an already learned vector in an existing neuron, making no change to the radial basis function network; and if the presented feature vector fall within a wrong influence field or is mismatched to a category, readjusting one or more influence fields.

4. A method according to claim 1, wherein the performing an image transformation step further comprises:
calculating length, width, area and mean pixel intensity values;
applying a threshold operator; and
removing spurious pixels from the image to obtain an extracted region of interest.

5. A method according to claim 4, wherein the spurious pixels are removed by a dilation operation or an erosion operation.

6. A method according to claim 1, wherein the presenting a feature vector step further comprises:
determining whether the feature vector lies within an active influence field of a prototype in the neural network;
if the vector is not within the active influence field of any prototype in the neural network, classifying the feature vector as not recognized; and
if the feature vector is within the active influence field of any prototype in the neural network, recognizing the input as belonging to the active influence field's corresponding category.

7. A method according to claim 1, wherein the raw sidescan sonar image is collected by a digital signal processor.

8. A method according to claim 7, wherein the sidescan sonar image is based on a frequency of about 600 kHz.

9. A method according to claim 1, wherein the sidescan sonar image is based on a frequency ranging from about 100 kHz to about 2.4 MHz.

10. A method according to claim 1, wherein the region of interest is separated from the image by an extraction algorithm.

11. A method according to claim 1, wherein the raw sidescan sonar image is collected by an autonomous underwater vehicle.

12. A system for identifying and quantifying sonar targets of interest within a liquid medium comprising:
an autonomous underwater vehicle;
a transducer mounted on the autonomous underwater vehicle to generate a sidescan sonar image;
a processor, for collecting the sidescan sonar image, housed inside the autonomous water vehicle, the processor configured to:
separate a region of interest related to the sonar targets from the image;
perform an image transformation on the image using an extraction algorithm;
perform particle analysis on the extracted region of interest to generate a feature vector related to sonar targets; and
present the feature vector to a neural network to classify the image with respect to the sonar targets of interest.

13. The system of claim 12 further comprising a communication unit housed in the autonomous underwater vehicle for automatic reporting of positive identification of the sonar targets of interest.

14. The system of claim 12, wherein the perform an image transformation by the processor step further comprises:
calculating length, width, area and mean pixel intensity values;
applying a threshold operator; and
removing spurious pixels from the image to obtain an extracted region of interest.

15. The system of claim 12, wherein the neural network to classify the image comprises a radial basis function neural network.

16. The system of claim 15, wherein the radial basis function neural network is trained with prototype sidescan sonar images by performing the steps of:
obtaining a feature vector derived from the prototype image;
presenting the feature vector to the radial basis function neural network;
if the presented feature vector is not within an influence field of any prototypes already stored in the network, committing a new neuron to the presented vector;
if the presented feature vector falls within an influence field of an already learned vector in an existing neuron, making no change to the radial basis function network; and
if the presented feature vector fall within a wrong influence field or is mismatched to a category, readjusting one or more influence fields.

17. The system of claim 12, wherein the processor comprises a digital signal processor for collecting the sidescan sonar image.

18. The system of claim 12, wherein the transducer has a range setting in the range of five to ten meters.

19. The system of claim 12, wherein the present a feature vector step in the processor further comprises:
determining whether the feature vector lies within an active influence field of a prototype in the neural network;
if the vector is not within the active influence field of any prototype in the neural network, classifying the feature vector as not recognized; and
if the feature vector is within the active influence field of any prototype in the neural network, recognizing the input as belonging to the active influence field's corresponding category.

20. A computer readable medium having program code recorded thereon, that when executed on a processor, identifies and quantifies a sonar target of interest in a liquid medium, the program code comprising:
code for receiving a sidescan sonar image from a sonar region being monitored;
code for separating a region of interest related to the sonar targets from the image;
code for performing an image transformation on the image using an extraction algorithm;
code for performing particle analysis on the extracted region of interest to generate a feature vector; and
code for presenting a feature vector related to the sonar targets to a neural network to classify the image with respect to the sonar targets of interest.

* * * * *